United States Patent [19]

Johnson

[11] Patent Number: 5,400,542

[45] Date of Patent: Mar. 28, 1995

[54] FISHING LURE SYSTEM WITH FLEXIBLE SUPPORT ROD

[76] Inventor: Willie C. Johnson, 5624 Old Hickory Ln., Tallahassee, Fla. 32303

[21] Appl. No.: 134,756

[22] Filed: Oct. 12, 1993

[51] Int. Cl.$^6$ .............................................. A01K 85/00
[52] U.S. Cl. .................. 43/42.06; 43/42.13; 43/42.14
[58] Field of Search ................. 43/42.06, 42.11, 42.13, 43/42.19, 42.2, 42.44, 42.14, 42.16, 42.17, 42.18

[56] References Cited

U.S. PATENT DOCUMENTS

| | | | |
|---|---|---|---|
| 4,209,932 | 7/1980 | Pate | 43/42.13 |
| 4,571,877 | 2/1986 | Montgomery | 43/42.13 |
| 4,640,041 | 2/1987 | Stanley | 43/42.13 |
| 4,805,339 | 2/1989 | Fuentes | 43/41.31 |
| 4,815,233 | 3/1989 | Pingel | 43/42.13 |
| 5,113,606 | 5/1992 | Rinker | 43/42.06 |
| 5,146,706 | 9/1992 | Hilliard | 43/42.13 |
| 5,201,784 | 4/1993 | McWilliams | 43/42.13 |

Primary Examiner—P. Austin Bradley
Assistant Examiner—James Miner
Attorney, Agent, or Firm—Hugh E. Smith

[57] ABSTRACT

A flexible fishing bait assembly for catching fish with a rod, reel and line comprising a support rod configured with an eyelet in a central extent thereof for coupling to a fishing line. The support rod has a first extent continuing linearly as an extension of the first end of the eyelet, a hook coupled to the end and a fish-attracting member molded over the region of coupling between the loop and the hook. The support rod also includes a second extent extending away from the first extent from the second end of the eyelet. The support rod is fabricated of a plurality of discrete strands of carbon steel in a spiral configuration to allow for flexing of the support rod when pulled in one direction by a fish on the hook and in the other direction by a fisherman. Fish-attracting components are coupled to the second extent of the support rod.

5 Claims, 4 Drawing Sheets

FISHING LURE SYSTEM WITH FLEXIBLE SUPPORT ROD

BACKGROUND OF THE INVENTION

1. Field of the Invention

The present invention relates to fishing lure systems with a flexible support rod and more particularly pertains to a system for catching fish wherein the support rod for the components elements is flexible.

2. Description of the Prior Art

The use of fishing lure systems is known in the prior art. More specifically, fishing lures heretofore devised and utilized for the purpose of catching fish are known to consist basically of familiar, expected and obvious structural configurations, notwithstanding the myriad of designs encompassed by the crowded prior art which have been developed for the fulfillment of countless objectives and requirements.

Prior art patents related to various fishing lures are disclosed in U.S. Pat. No. 4,201,008 to Sparkman which discloses a plurality of conventional spinners. In addition, U.S. Pat. No. 4,209,932 to Pate as well as U.S. Pat. No. 4,773,180 to Shimizu disclose lures with plural spoons. U.S. Pat. No. 5,024,019 to Rust discloses a fishing lure with a spoon and a sound generating rattle. Lastly, U.S. Pat. No. 4,011,681 to Johnson discloses a fishing lure with a spoon and a spring element in one portion of the support rod for increased flexibility. No prior art patent discloses the relationship of a system including a support rod formed of the flexible material of the present invention.

In this respect, the fishing lure system with flexible support rod according to the present invention substantially departs from the conventional concepts and designs of the prior art, and in so doing provides an apparatus primarily developed for the purpose of allowing flexibility of the lure.

Therefore, it can be appreciated that there exists a continuing need for new and improved fishing lure systems which can be used for more effective fishing. In this regard, the present invention substantially fulfills this need.

SUMMARY OF THE INVENTION

In view of the foregoing disadvantages inherent in the known types of fishing lures now present in the prior art, the present invention provides an improved fishing lure system with flexible support rod. As such, the general purpose of the present invention, which will be described subsequently in greater detail, is to provide a new and improved fishing lure system with flexible support rod apparatus and method which has all the advantages of the prior art and none of the disadvantages.

To attain this, the present invention essentially comprises a flexible fishing bait assembly for catching fish with a rod, reel and line comprising, in combination a support rod configured with an eyelet in a central extent thereof for coupling to the line of a fishing reel and rod, the support rod having a first extent continuing linearly as an extension of one end of the eyelet, a loop formed at the end of the first extent remote from the eyelet with a hook coupled with respect to the loop and an elastomeric fish-attracting member molded over the region of coupling between the loop and the hook, the support rod also including a second extent extending generally transversely from the first extent from the second end of the eyelet, the support rod being fabricated of a plurality of discrete strands of carbon steel in a spiral configuration about an axis to allow for flexing of the support rod when pulled in one direction by a fish on the hook and in the other direction by a fisherman; fish-attracting components coupled with respect to the second extent of the support rod, the fish-attracting components including a spinner rotatable about an axis perpendicular to the second extent and an associated ball pivotally secured to an intermediate portion of the second extent whereby the rotation of the spinner will periodically contact the ball for generating a fish-attracting sound.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing lure system with a flexible support rod which has all the advantages of the prior art and none of the disadvantages.

It is another object of the present invention to provide a new and improved fishing lure system with a flexible support rod which may be easily and efficiently manufactured and marketed.

It is a further object of the present invention to provide a new and improved fishing lure system with a flexible support rod which is of a durable and reliable construction.

An even further object of the present invention is to provide a new and improved fishing lure system with a flexible support rod which is susceptible of a low cost of manufacture with regard to both materials and labor, and which accordingly is then susceptible of low prices of sale to the consuming public, thereby making such fishing lure systems with a flexible support rod economically available to the buying public.

Still yet another object of the present invention is to provide a new and improved fishing lure system with a flexible support rod which provides in the apparatuses and methods of the prior art some of the advantages thereof, while simultaneously overcoming some of the disadvantages normally associated therewith.

Still another object of the present invention is to support fishing components on a flexible support rod.

Yet another object of the present invention is to enhance the productivity of fishermen.

Even still another object of the present invention is to provide a new and improved a flexible fishing bait assembly for catching fish with a rod, reel and line comprising a support rod configured with an eyelet in a central extent thereof for coupling to a fishing line, the support rod having a first extent continuing linearly as an extension of the first end of the eyelet, a hook coupled to the end and a fish-attracting member molded over the region of coupling between the loop and the hook, the support rod also including a second extent extending away from the first extent from the second end of the eyelet, the support rod being fabricated of a plurality of discrete strands in a spiral configuration to allow for flexing of the support rod when pulled in one direction by a fish on the hook and in the other direction by a fisherman; fish-attracting components coupled with respect to the second extent of the support rod.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
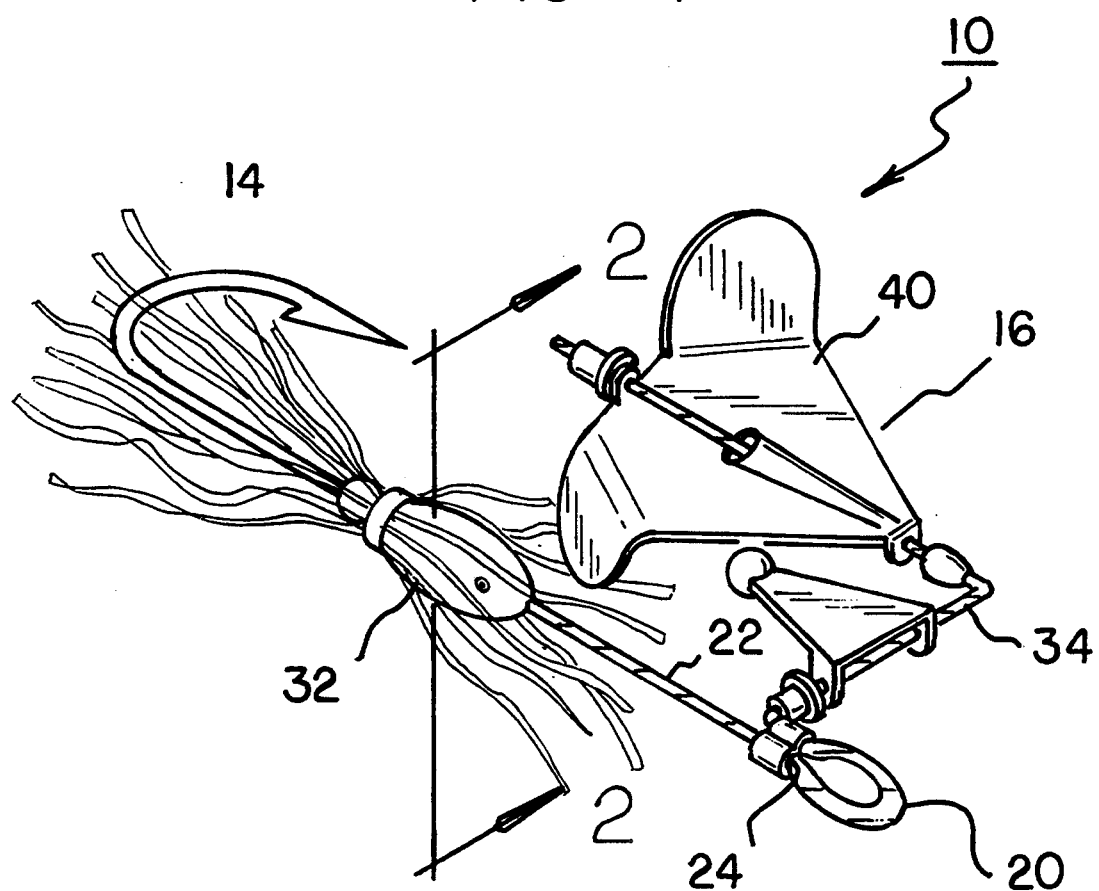
FIG. 1 is a perspective illustration of a fishing lure constructed in accordance with the principles of the present invention.

With reference now to the drawings, and in particular to FIG. 1 thereof, a new and improved fishing lure system with a flexible rod embodying the principles and concepts of the present invention and generally designated by the reference numeral 10 will be described.

Figure 2:
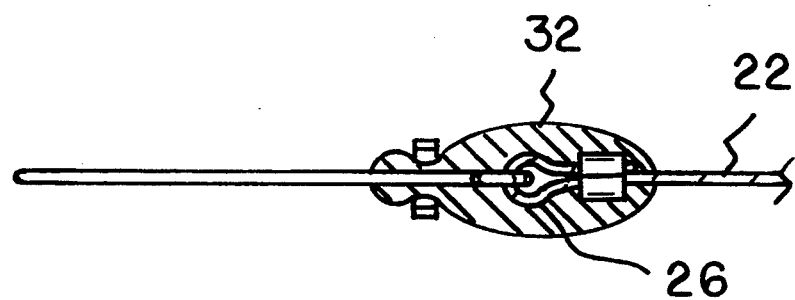
FIG. 2 is a sectional view taken through line 2—2 of FIG. 1.
Figure 3:
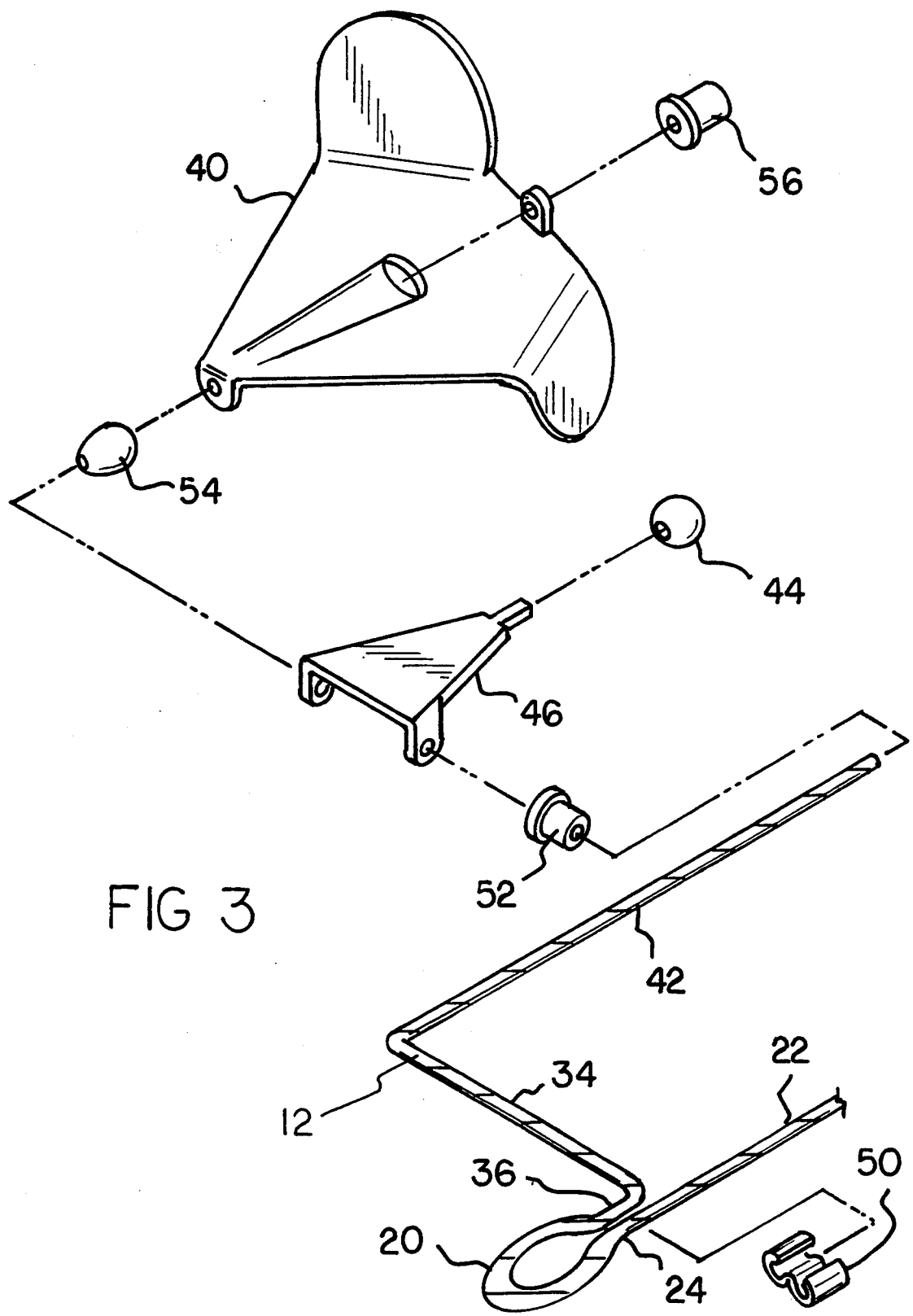
FIG. 3 is an exploded perspective view of the fishing lure as shown in FIG. 1.

More specifically, it will be noted that FIGS. 1 through 3 illustrate a flexible fishing bait system or assembly 10 for catching fish with a rod, reel and line. The system comprises in the broadest of terms, a support rod 12, hook 14 and fish-attracting components 16.

The support rod 12 is configured with an eyelet 20 in a central extent thereof. The support rod is for coupling to the line of a conventional fishing reel and rod, not shown. The support rod has a first extent 22 which continues linearly as an extension of the first end 24 of the eyelet 20. A loop 26 is formed at the end of the first extent remote from the eyelet. A hook 14 is coupled with respect to the loop 26. A fish-attracting member 32 is molded over the region of coupling between the loop 26 and the hook 14. The support rod 12 also includes a second extent 34 which extends generally transversely from the first extent 22 beginning at the second end 36 of the eyelet 20.

The support rod is fabricated of a plurality of discrete strands of carbon steel or other appropriate metal in a spiral configuration. Such a construction allows for flexing of the support rod 12 when pulled in one direction by a fish on the hook and in the other direction by a fisherman.

Fish-attracting components are coupled with respect to the second extent 34 of the support rod 12. The fish-attracting components include a spinner 40 rotatable about an axis on a further part 42 of the second extent perpendicular to the first extent 22. Movement between the water and spinner during fishing effects the rotation of the spinner. An associated ball 44 is pivotally secured through a triangular plate 46 to the intermediate portion of the second extent 34. In this manner, rotation of the spinner 40 will periodically contact the ball 44 and pivot it for generating a fish-attracting sound. Associate crimp members 50, 52, 54, and 56 secure the various components of the system to the support rod 12 to preclude undesired movement axially with respect to the support rod.

Figure 4:
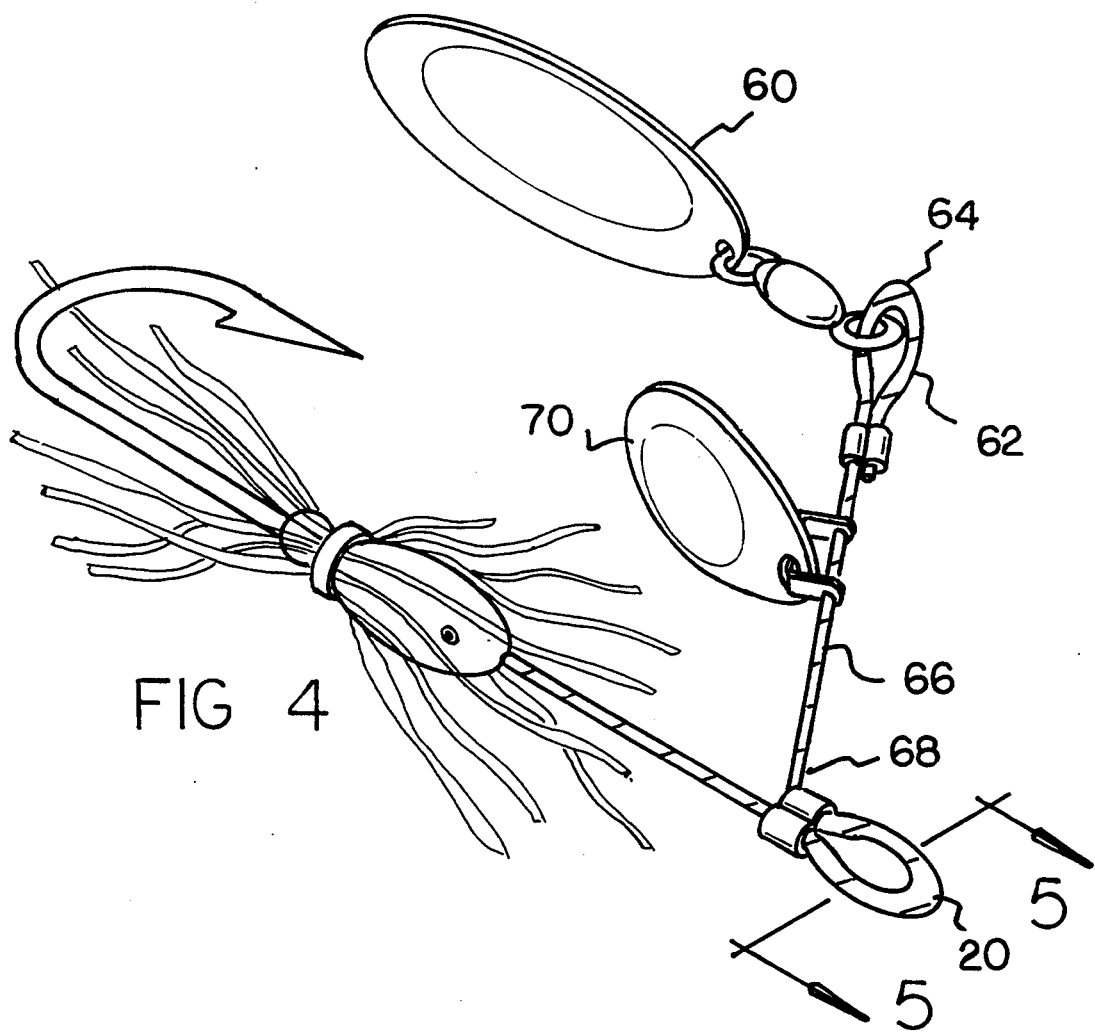
FIG. 4 is a perspective view of a fishing lure constructed in accordance with an alternate embodiment of the present invention.
Figure 5:
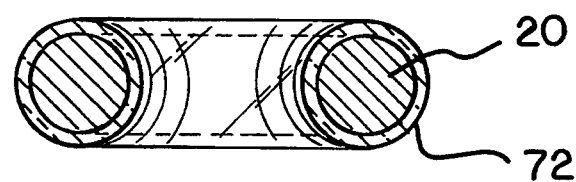
FIG. 5 is a sectional view taken through line 5—5 of FIG. 4.

In the second embodiment, that shown in FIGS. 4 and 5 the fish-attracting components include a first spoon 60 coupled to an eyelet 12 at the end 64 of the second extent 66 of the support rod 68. In addition, a second spoon 70 is pivotally coupled to an intermediate section of the support rod 68. The pivoted coupling also allows for sliding of the second spoon 70 with respect to the support rod 68. A coating 72 of a transparent lubricous elastomeric material is formed over the support rod at the eyelet 20. Such coating may be formed over the entire support rod of any embodiment to preclude wear of the support rod and extend its life.

Figure 6:
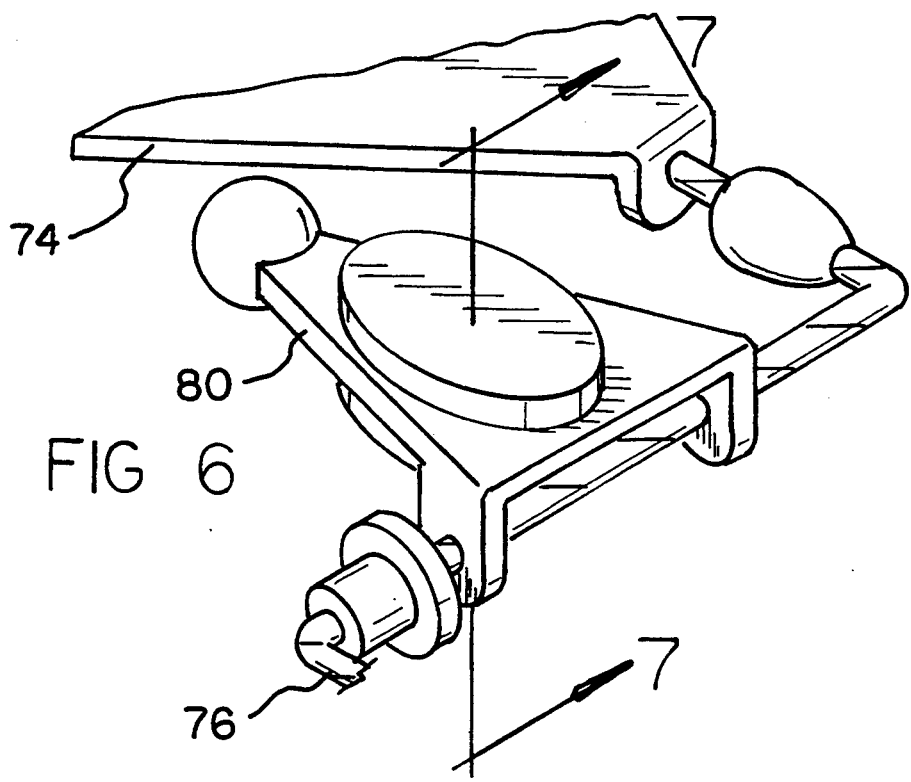
FIG. 6 is a perspective view of a portion of a lure constructed in accordance with an alternate embodiment of the present invention.
Figure 7:
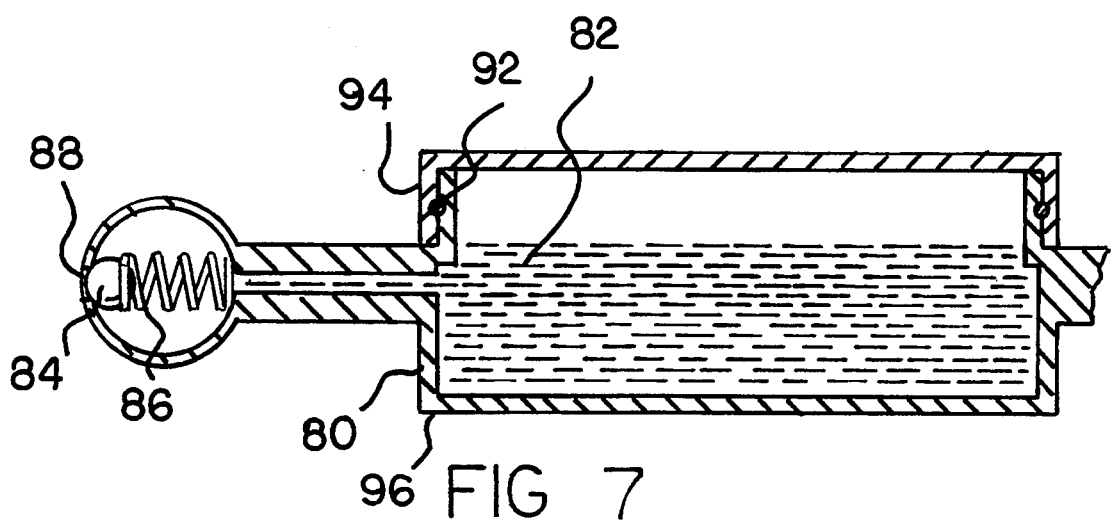
FIG. 7 is a sectional view taken along line 7—7 of FIG. 6.

FIGS. 6 and 7 illustrate a further embodiment of the invention. According to such embodiment, the fish-attracting components include a spinner 74 rotatable about an axis essentially parallel with the axis with the first extent 76 of the support rod 78. A dispenser 80 is provided for receiving a fish-attracting fluid 82. Such dispenser is adapted to be contacted periodically by the rotation of the spinner 74 for dispensing the fluid 82 periodically. The dispensing in response to the rotation of the spinner 74. The dispensing component 80 includes a ball 84 urged by a spring 86 against an aperture 88 in the dispensing component 80 which is adapted to have the ball 84 move out of contact with the aperture 88 upon being contacted by the rotating spinner 74. An elastomeric O-ring 92 couples the upper half 94 of the dispensing component 80 with a lower half 96 for filling the dispensing component 80 with the fluid 82.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A flexible fishing bait assembly for catching fish with a rod, reel and line comprising, in combination:

a unitary support rod configured with an eyelet in a central extent thereof for coupling to the line of a fishing reel and rod, the support rod having a first extent continuing linearly as an extension of one end of the eyelet, a loop formed at the end of the first extent remote from the eyelet with a hook coupled with respect to the loop and an elastomeric fish-attracting member molded over the region of coupling between the loop and the hook, the support rod also including a second extent extending generally transversely from the first extent from the second end of the eyelet, the support rod being fabricated of a plurality of discrete strands of carbon steel in a spiral configuration about an axis to allow for flexing of the support rod when pulled in one direction by a fish on the hook and in the other direction by a fisherman;

fish-attracting components coupled with respect to the second extent of the support rod, the fish-attracting components including a spinner rotatable about an axis perpendicular to the second extent and an associated ball pivotally secured to an intermediate portion of the second extent whereby the rotation of the spinner will periodically contact the ball for generating a fish-attracting sound.

2. A flexible fishing bait assembly for catching fish with a rod, reel and line comprising:

a support rod configured with an eyelet in a central extent thereof for coupling to a fishing line, the eyelet having a first end and a second end, the support rod having a first extent continuing linearly as an extension of the first end of the eyelet, a hook coupled to the first extent and a fish-attracting member molded over the region of coupling between the loop and the hook, the support rod also including a second extent extending away from the first extent from the second end of the eyelet, the entire support rod being fabricated along its length of a plurality of discrete strands of carbon steel in a spiral configuration to allow for flexing of the support rod when pulled in one direction by a fish on the hook and in the other direction by a fisherman; and fish-attracting components coupled with respect to the second extent of the support rod.

3. The system as set forth in claim 2 wherein the fish-attracting components include a spinner rotatable about an axis parallel with the axis of the first extent of the support rod and associated sphere pivotally coupled to the second extent adapted to be contacted by the rotating spinner for generating a fish-attracting sound.

4. The system as set forth in claim 3 wherein the fish-attracting components further include a dispenser for a fish-attracting fluid supporting the sphere for dispensing fluid from the dispenser periodically in response to the rotation of the spinner, the dispenser also including a ball and a spring urged against an aperture in the dispenser adapted to have the ball move out of contact with the aperture upon the sphere being contacted by the rotating spinner.

5. The system as set forth in claim 2 wherein the fish-attracting components include a first spoon coupled to an eyelet at the end of the second extent of the support rod and a secondary spoon pivotally coupled to an intermediate section of the second extent and axially movable therealong.

* * * * *